Figure 4:
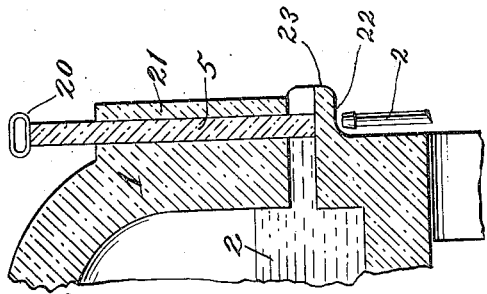

No. 841,112. PATENTED JAN. 15, 1907.
H. M. BROOKFIELD.
GLASS FURNACE.
APPLICATION FILED MAR. 3, 1902.

WITNESSES:
Timothy E Raftery
John O. Gunkler

INVENTOR
Henry M. Brookfield
BY
Kenyon & Kenyon
ATTORNEYS

UNITED STATES PATENT OFFICE.

HENRY M. BROOKFIELD, OF NEW YORK, N. Y.

GLASS-FURNACE.

No. 841,112.        Specification of Letters Patent.        Patented Jan. 15, 1907.

Application filed March 3, 1902. Serial No. 96,364.

*To all whom it may concern:*

Be it known that I, HENRY M. BROOKFIELD, a citizen of the United States, and a resident of the city, county, and State of New York, have invented certain new and useful Improvements in Glass-Furnaces, of which the following is a specification.

My invention relates to glass-furnaces.

It has for its object to improve the means for discharging molten glass from a furnace; also, to discharge the molten glass directly through the side of the furnace and to do this without chilling the glass or impairing its fluidity; also, to provide means for delicately and accurately controlling the flow of molten glass therefrom; also, to provide means for protecting the valve from excessive heating; also, to provide means for temporarily stopping the flow of molten glass from a furnace should the valve be injured or should it be necessary for any reason to remove it.

It consists of the novel devices and combinations herein shown and described.

In the drawings accompanying this specification and forming a part hereof I have shown a glass-furnace with my improvement in its preferred form connected therewith.

Figure 1:
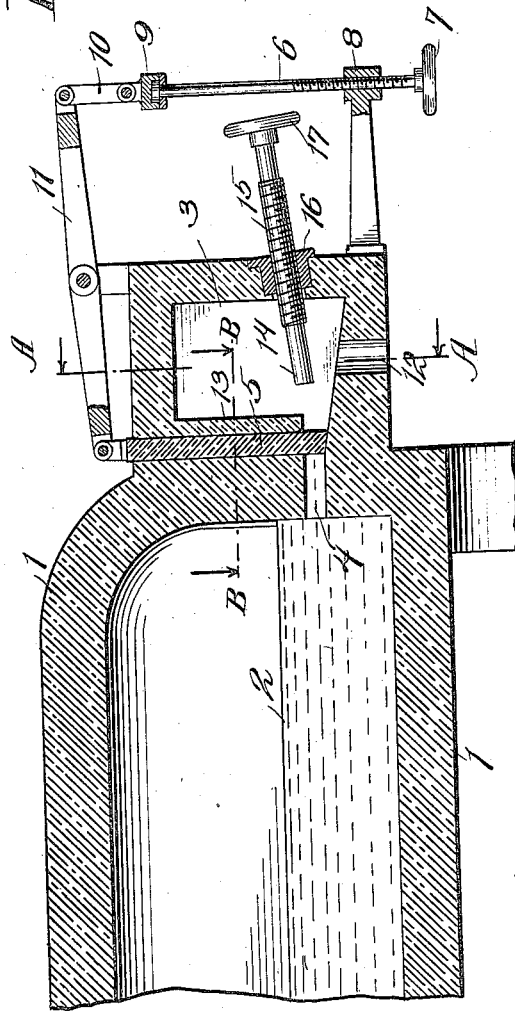
Figure 3:
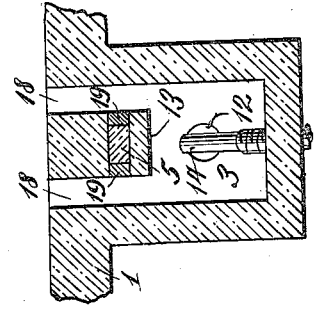
Figure 2:
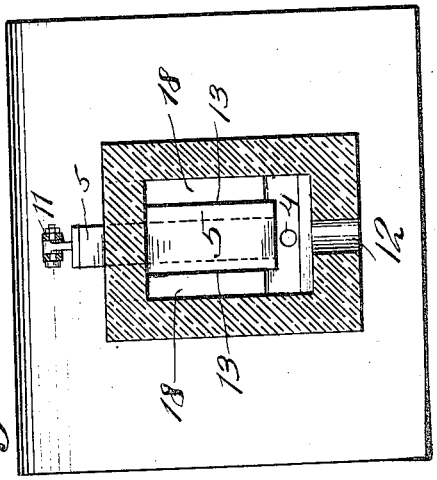

Referring to the form or embodiment of my invention shown in the drawings, Figure 1 is a longitudinal section through a part of a glass-furnace embodying my improvement in its preferred form. Fig. 2 is a vertical cross-section on the lines A A of Fig. 1 viewed as shown by the arrow. Fig. 3 is a horizontal cross-section on the line B B of Fig. 1, and Fig. 4 illustrates a modification of my improvement.

Heretofore, in the practical art of handling molten glass, it has been the practice to take the molten glass out of the furnace by hand. Attempts have been made to cause the molten glass to flow through openings in the side of the furnace; but, as far as I am aware, such efforts have failed. The chief difficulty lies in the fact that in such cases the glass is caused to flow through or over surfaces comparatively cold, which chills the glass and causes it immediately to lose its fluid character. Instead of flowing it congeals and completely clogs the discharge-orifice. I have discovered that if the material over which the glass must pass in its flow from the furnace is either reduced to such a small amount that it quickly heats or has no appreciable effect in chilling the glass or if such material as the glass must pass over in its flow is heated or kept hot by any suitable means it is possible and feasible to automatically cause the glass to flow from the furnace without losing its fluidity.

In Figs. 1, 2, and 3 I have shown the preferred form which I employ for carrying out my improvement. In Fig. 4 I have shown as a modification devices for such discharge presenting a minimum surface for the glass to pass over in its flow.

I will now proceed to describe the preferred form. (Shown in Figs. 1, 2, and 3.) 1 represents a glass-furnace, and 2 the molten glass therein. This furnace is provided at one side with a heating-chamber 3, a channel 4 connecting the interior of the furnace with the chamber and providing a means for the flow of the molten glass from the former to the latter. The channel 4 is preferably located at some distance below the normal level of the molten glass in the furnace in order that the molten glass drawn off may be drawn from a point at some distance below the surface to avoid taking the impurities which generally float upon the top of the molten glass. It is also preferably located at a sufficient distance above the bottom of the furnace to insure that the molten glass shall be sufficiently liquid to flow properly. In practice I prefer to arrange it about as shown in the drawings. 5 is a valve-gate for closing and opening channel 4 and for regulating the flow of the molten glass through the same. Any suitable means may be employed for moving this gate. In the form shown it is made vertically reciprocating and is controlled through a screw-threaded rod 6, provided with a hand-wheel 7 and passing through a support 8, interiorly screw-threaded and connected at its upper end through rounded head 9 to a link 10, pivoted at its upper end to a lever 11, to which is pivoted at its other end valve-gate 5, as shown in Fig. 1. The rounded head 9 of rod 6 is seated in a similar-shaped cavity in the lower part of link 10 and is free to turn therein. By turning hand-wheel 7 in one direction or the other valve-gate 5 can be delicately and accurately adjusted to control the flow of molten glass from the furnace or to shut it off altogether. 12 is a discharge-orifice leading from chamber 3 for discharging the molten glass. In its flow through channel 4 to and through orifice 12 the molten glass necessarily passes over a considerable extent of brick, and if no means for heating or keeping this length of brick heated were employed the molten glass would congeal and clog channel 4 and utterly prevent the discharge of molten glass from the furnace. To avoid this, I use means for keeping such surfaces heated over which the glass must pass in its flow and sufficiently so to maintain the fluidity of the glass. Any suitable means may be employed for this purpose. I prefer to use for this purpose a heating-chamber 3, which will sufficiently cover and protect the parts over which the glass must flow, sufficiently heating them to prevent their congealing the molten glass. This chamber may assume any suitable form. In the drawings it is shown as an inclosed box or rectangular apartment, although it is not absolutely necessary that it be inclosed on all sides as long as it affords sufficient means for protecting the surfaces in question from becoming chilled or for keeping them sufficiently heated. I prefer to employ means for heating this chamber. Any suitable means may be employed for that purpose. As shown, I heat it directly from the interior of furnace 1 by means of openings 18, (shown in Figs. 2 and 3,) which pass through the wall of the furnace from the interior into chamber 3. It is not necessary, however, to heat this chamber from the furnace, as it may, for example, be heated independently, as by oil-jets placed therein or by any other suitable heating means. As chamber 3 is kept very hot and as the heat rapidly affects and destroys a valve-gate, such as 5, I preferably place a guard 13 in front of the valve-gate 5, so that no part of the valve-gate is exposed except the extreme lower edge. This guard 13 may be made of any suitable material. As shown, it has sides 19, which overlap and cover the edges of gate 5, as shown in Fig. 3.

As it is necessary at times to remove valve-gate 5 for purposes of repair or for replacing it with another valve-gate, I preferably provide means for temporarily stopping the flow of glass from the furnace while the valve-gate is out of operative position. For this purpose I provide a stopper 14, which in the form shown consists of a rod screw-threaded at 15 and passing through a support 16, located in the walls of chamber 3 and interiorly screw-threaded and also provided with a hand-wheel 17. The inner end of stopper 14 is made of such shape as to enter and fit exactly the outer end of channel 4, and when 17 is turned in one direction this stopper 14 will fill channel 4 at its outer end and effectually prevent any further flow of molten glass. Stopper 14 may itself be used as a valve, if desired.

In Fig. 4 I have shown a modification of my improvement, in which chamber 3 is dispensed with. In this case I reduce to a minimum the surface over which the glass must flow before being discharged. To accomplish this, the lower wall of the furnace, which forms the bottom of channel 4, is continued outward in a projection 22 just far enough to furnish a seat for gate 5 and a projecting lip 23, from which the molten glass drops in its flow. With this construction chamber 3 and guard 13 are dispensed with. Stopper 14 could be used, if desired, mounting it upon any suitable support. In Fig. 4 for convenience sake I have simply shown valve-gate 5 as provided with a handle 20 at the top, by means of which it can be manually raised or lowered and as passing behind a part 21 of the furnace-wall. Of course any means may be employed for moving the gate—such, for example, as that shown in Fig. 1. In such a device as that shown in Fig. 4 I prefer, however, to use positive means for heating the surfaces over which the glass flows in its discharge, and I have illustrated in this figure an oil-jet 24, suitably supported on the furnace and adapted to play its flame upon the under side 22 of projection 23. The channel 4 may of course be located in any wall of the furnace desired, whether a side wall or an end wall.

By means of my improvement molten glass can be fed from a furnace in a simple and effective manner and will flow directly through the side of the furnace without clogging, the surfaces over which the molten glass passes in its flow will not chill and congeal the glass, the quality of the molten glass fed out is good, impurities which float at the top of the molten glass being unable to mingle with the molten glass that is discharged. A durable valve is, moreover, provided to stop or control the flow of the molten glass, and efficient means are provided for readily removing and replacing the valve-gate and for stopping the flow of molten glass during such removal. My improved device further enables the flow of molten glass to be accurately gaged.

Many departures from or modifications in the particular form of my improvement shown in the drawings may of course be made without departing from my invention, the essentials of which are set forth in the claims appended hereto.

What I claim as new, and desire to secure by Letters Patent, is—

1. A furnace for molten glass provided with a heating-chamber at one side of the furnace, a channel through the wall of the furnace connecting the interior of the furnace with the chamber for the flow of molten glass from the former to the latter, a valve adapted to regulate the flow of the glass through such channel, and a stopper adapted to enter the outer end of the said channel to close the same when the valve-gate is open or removed.

2. A furnace for molten glass provided with a heating-chamber at one side of the furnace, a channel through the wall of the furnace connecting the interior of the furnace with the chamber for the flow of molten glass from the former to the latter, a valve adapted to regulate the flow of the glass through such channel, a stopper adapted to enter the outer end of the said channel to close the same when the valve-gate is open or removed, and screw-threaded means connected with said stopper for moving the same to cause it to close or open the said channel.

3. A furnace for molten glass provided with an opening for the discharge of molten glass therefrom, means for regulating the size of such opening so as to regulate the flow of the molten glass in accordance with the fluidity of the glass or temperature of the opening so as to permit the flow of glass in such a relatively small stream as to be adapted to make glass insulators or other similar small glass articles, and means for heating the opening and the surface over which the glass must pass in its flow from the furnace to the point of discharge sufficiently to prevent the glass from congealing and clogging.

4. A furnace for molten glass provided with a heating-chamber at one side of the furnace, a channel through the wall of the furnace connecting the interior of the furnace with the chamber for the flow of molten glass from the former to the latter, a valve for regulating the size of such channel so as to regulate the flow of the molten glass in accordance with the fluidity of the glass or the temperature of the channel so as to permit the flow of molten glass in such a relatively small stream as to be adapted to make glass insulators or other similar small glass articles, a discharge-orifice leading from said chamber for the discharge of molten glass therefrom, and means for heating said chamber to keep heated the said channel and the surface over which the glass must pass in its flow to prevent the glass from congealing and clogging.

In testimony whereof I have signed my name to this specification in the presence of two subscribing witnesses.

HENRY M. BROOKFIELD.

Witnesses:
JOHN O. GEMPLER,
EDWIN SEGER.